US005158521A

United States Patent [19]

Singh

[11] Patent Number: 5,158,521

[45] Date of Patent: Oct. 27, 1992

[54] EMBOSSING DISPENSER

[75] Inventor: Balbir Singh, Media, Pa.

[73] Assignee: Scott Paper Company, Philadelphia, Pa.

[21] Appl. No.: 825,746

[22] Filed: Jan. 23, 1992

Related U.S. Application Data

[63] Continuation of Ser. No. 623,169, Dec. 5, 1990, abandoned.

[51] Int. Cl.[5] .......................... B31F 1/07; B31F 7/02; B65H 17/38; B29C 17/12

[52] U.S. Cl. .................................. 493/354; 493/395; 493/463; 162/117; 162/282; 162/286; 162/296; 264/282; 101/6

[58] Field of Search .............. 493/354, 370, 395, 396, 493/400, 403, 463, 464; 162/117, 282, 286, 296; 264/282; 101/6

[56] References Cited

U.S. PATENT DOCUMENTS

| | | | |
|---|---|---|---|
| Re. 27,453 | 8/1972 | Schutte et al. . | |
| 1,224,224 | 5/1917 | Shelley . | |
| 1,553,352 | 9/1925 | Amidon et al. . | |
| 1,571,594 | 2/1926 | Lorenz . | |
| 3,047,454 | 7/1962 | Marcalus . | |
| 3,062,378 | 11/1962 | Briggs | 493/463 |
| 3,337,388 | 8/1967 | Wosaba . | |
| 3,418,925 | 12/1968 | Wiggins . | |
| 3,616,157 | 10/1971 | Smith . | |
| 3,817,827 | 6/1974 | Benz . | |
| 3,935,802 | 2/1976 | Perrin et al. . | |
| 4,000,242 | 12/1976 | Hartbauer . | |
| 4,189,344 | 2/1980 | Busker . | |
| 4,242,409 | 12/1980 | Parker . | |
| 4,325,768 | 4/1982 | Schulz . | |
| 4,361,085 | 11/1982 | Schutz . | |
| 4,614,632 | 9/1986 | Kezuka et al. . | |
| 4,803,032 | 2/1989 | Schulz . | |

FOREIGN PATENT DOCUMENTS

| | | |
|---|---|---|
| WO8503029 | 7/1985 | PCT Int'l Appl. . |
| 901387 | 7/1960 | United Kingdom . |

*Primary Examiner*—William E. Terrell
*Attorney, Agent, or Firm*—Mark G. Bocchetti; John W. Kane, Jr.

[57] ABSTRACT

A rolled paper embossing dispenser in which the paper is embossed and from which the paper is simultaneously dispensed. The dispenser includes a nip formed by a first embossing roll and a second embossing roll, both rotatably mounted within a cabinet. The first embossing roll has a plurality of spaced-apart annular bands with each annular band including discrete, spaced-apart knuckle projections extending radially from the roll. The second embossing roll includes annular slots and annular extensions arranged in alternating relationship with each annular slot having sufficient width to receive the knuckle projections without contacting any portion thereof as paper is fed through the nip and embossed. A lever or crank is provided for a user to rotationally drive one of the embossing rolls, the other embossing roll rotating only in response to the paper being drawn through the nip such that rotational slippage of one roll with respect to the other will not result in breaking or tearing the web.

9 Claims, 3 Drawing Sheets

EMBOSSING DISPENSER

This application is a continuation of application Ser. No. 07/623,169, filed Dec. 5, 1990, abandoned.

BACKGROUND OF THE INVENTION

1. Field of the Invention.

This invention relates generally to a cabinet for dispensing rolled sanitary paper products, and more particularly, to a dispensing cabinet in which a roll of sanitary paper is embossed as it is dispensed.

2. Brief Description of the Prior Art.

Rolled sanitary paper products such as paper toweling and toilet tissue are commonly dispensed from cabinets in public washrooms. When economy is primary consideration, a relatively smooth, flat paper is wound very tightly into a roll to maximize the length of paper for a given diameter of the roll. By maximizing the length of paper on the roll, the roll generally lasts longer which increases the time between roll replacement in the cabinet. The cabinet may also contain a second roll of paper that automatically begins feeding as the first roll becomes fully deplete which further increases the time period from one refill operation to the next. When economy is a primary consideration, it is also common to use lower graded, such as unbleached or light brightness papers in the dispensing cabinets. Such economy rolled paper product can generally be characterized as dense, stiff and having limited absorbency when compared to higher quality sanitary paper products.

When economy is not a primary consideration and it is desired to provide a higher quality rolled sanitary paper product in the dispensing cabinet, the usual approach has been to soften the paper by pre-treating it. Usually this pre-treatment is accomplished by embossing the paper sheets prior to winding it on the roll. As used in this specification, the term embossing means raising the surface of the paper sheet into bosses or protuberances in such a manner that the length of the embossed sheet is substantially the same as the length of the sheet prior to embossing. One short coming of embossing paper prior to winding it on a roll is that the winding operation is counterproductive to embossing. In other words, the act of winding the paper on the rolls negates much of the benefit gained by embossing. The winding operation tends to compress the bosses formed in the paper with the result that the dispensed paper has less bulk and softness and potentially less absorbency then it had prior to the winding operation. If, on the other hand, the embossed paper is wound loosely on the roll in order to retain the bulk and softness gained from the embossing process, the length of the paper wound on the roll will be substantially reduced and the dispensing cabinet would therefore require much more frequent servicing.

A further shortcoming of dispensing an embossed paper, particularly the dispensing of embossed paper toweling, is the fact that in most rolled towel cabinets, the paper toweling is normally dispensed compressively by fastening the toweling through a nip formed by two feed rolls. U.S. Pat. No. 1,224,224 to Shelley is representative of such a dispensing cabinet. This application of compressive force to the embossed paper also tends to diminish the benefits gained from embossing.

One approach for improving the quality of rolled sanitary products dispensed from a cabinet is disclosed in U.S. Pat. No. 3,935,802 to Perrin, et al. Such patent teaches the crimping of the paper toweling web within the dispensing cabinet. Crimping is achieved by passing the web between a drive roll and a driven roll where each roll includes a series of axially aligned teeth extending therefrom in alternating circumferential relationship with a series of axially aligned valleys thereon. The plain or smooth paper toweling is drawn through the rolls and compressively abutted between the drive roll teeth and the driven roll teeth over the various crests of these teeth such that the plain paper toweling is foldably deformed into a crimped or serrated paper toweling web. One disadvantage of Perrin, et al. is that the effective length of the dispensed sheet is substantially decreased. Another disadvantage of Perrin is based on the well established fact that the softness and strength properties of sanitary paper are inversely related and, therefore, any bulking process that maintains the tensile strength of the dispensed sheet results in only slight improvement in sheet softness.

International publication no. W085/03029(PCT Application No. PCT/US85/00029) teaches a rolled paper embossing dispenser. There are two embossing rolls provided in such dispenser each having a plurality of knuckles projecting radially therefrom. In an alternative embodiment, there is taught an embossing roll 22 having a plurality of knuckles projecting radially therefrom used in conjunction with a roll that has a smooth, resilient surface. In both embodiments of such reference, the rolls must be operated in registration with one another. Timing gears are required.

SUMMARY OF THE INVENTION

It is therefore an object of the present invention to provide a rolled paper dispenser in which the rolled paper web is embossed as it is dispensed.

It is a further object of the present invention to provide a rolled paper dispenser wherein the rolls of the dispenser need not be run in registration with one another.

Still another object of the present invention is to provide a dispenser wherein embossing is accomplished by feeding the rolled paper web through two rolls, one of which has a plurality of knuckles projecting radially therefrom and a second roll having a plurality of annular grooves therein.

Yet another object of the present invention is to provide a rolled paper embossing dispenser requiring no timing gears.

A further object of the present invention is to provide a rolled paper dispenser wherein the sheet is uniformly embossed such that there are no cyclicly fluctuations.

Briefly, stated, that foregoing and numerous other objects, features and advantages of the present invention will become readily apparent upon reading of the detailed description, claims and drawings set forth herein. These objects, features and advantages are accomplished by mounting in a dispensing cabinet a pair of embossing rolls to form a nip there between. The first embossing roll includes a plurality of knuckles extending radially therefrom and arranged in a plurality of spaced, circumferential rows or bands. The second embossing roll includes a series of annular ridges and annular grooves arranged in alternating relationship. Each circumferential band of knuckles on the first embossing roll aligns with a single annular groove on the second embossing roll such that, in the nip area between the rolls, the knuckles of the first embossing roll extend into the annular grooves of the second embossing roll.

Means are supplied to rotationally drive the roll having the plurality of knuckles extending radially therefrom. A paper web thus driven through the nip formed by the two rolls is embossed with the action of the paper web moving through the nip serving to rotationally drive the second embossing roll. As such, embossing of the paper web is accomplished without having to run the embossing rolls in registration with one another.

DETAILED DESCRIPTION OF THE PREFERRED EMBODIMENT

Figure 1:
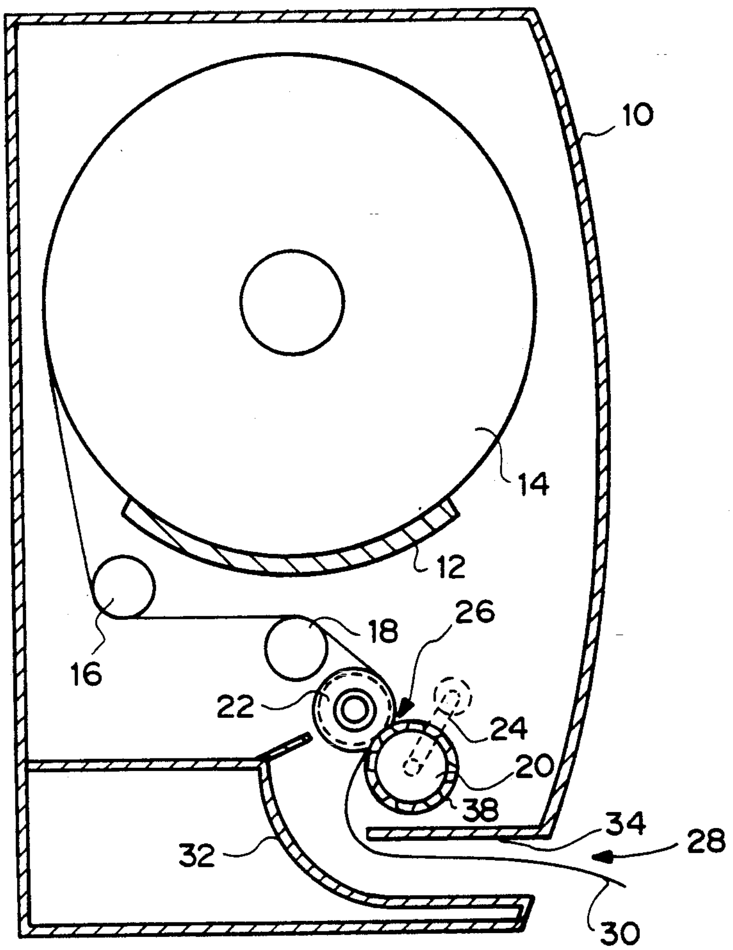
FIG. 1 a cross sectional side view of the embossing dispenser of the present invention.
Figure 2:
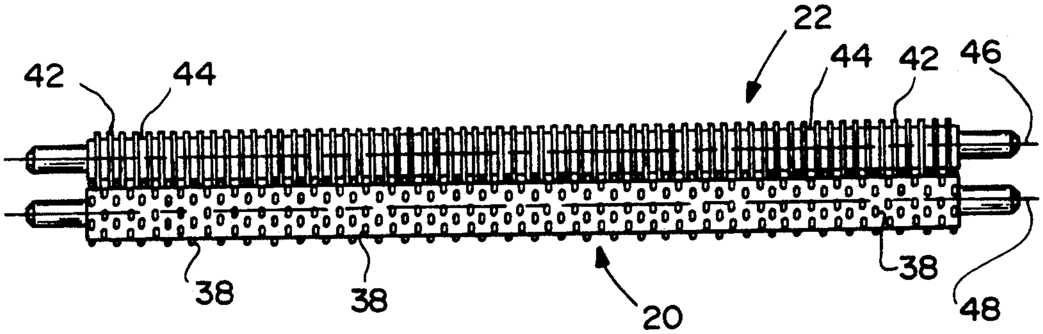
FIG. 2 is a plan view of the embossing rolls of the present invention.

Turning first to FIG. 1, there is shown a dispensing cabinet 10. Mounted within the dispensing cabinet 10 is a arcuate plate member of cradle 12 for supporting a rolled paper web 14. Pin or bar members extending from the sides of cabinet 10 for insertion into the center of roll 14 may be substituted for cradle 12. Also mounted within the cabinet 10 are a pair of idler rolls 16, 18. Mounted in the lower portion of cabinet 10 is a first or male embossing roll 20 and a second or female embossing roll 22. Both first and second embossing rolls 20, 22 are capable of rotational movement within cabinet 10. A crank 24 is provided to impart rotational movement to first embossing roll 20. There is a nip 26 formed between first embossing roll 20 and the second embossing roll 22.

An opening 28 is provided at the lower end of cabinet 10 through which embossed paper toweling 30 may exit cabinet 10. A baffle 32 is provided to guide toweling 30 to opening 28. A plate 34 is provided on the upper side of opening 28 to prevent users who may insert their fingers into opening 28 from being able to reach first embossing roll 20, second embossing roll 22 and nip 26 with such fingers.

In operation, flat paper toweling 36 from roll 14 extends about idler rolls 16, 18, through nip 26 and through opening 28. By imparting rotational movement to first embossing roll 20 by means of crank 24, flat paper toweling 36 is embossed at nip 26.

Looking next at FIGS. 2, 3, 5 and 6, there is shown in greater detail the male embossing roll 20 and female embossing roll 22 of the present invention. Extending radially from male embossing roll 20 are a plurality of knuckles 38. Knuckles 38 are arranged in a plurality of spaced, circumferential rows or bands 40 as most clearly shown in FIG. 3 and 5.

Female embossing roll 22 includes a plurality of annular extensions 42 and annular grooves 44 arranged in alternating relationship along the length of female embossing roll 22. Annular extensions 42 and annular grooves 44 are substantially perpendicular to the cylindrical axis 46 of female embossing roll 22. Similarly, a plane extending through the center of each knuckle 38 of the single circumferential row 40 is substantially perpendicular to the cylindrical axis 48 of male embossing roll 20.

The width of each of the grooves 44 is greater than the width of each knuckle 38 such that as knuckles 38 rotate through nip 26, knuckles 38 project into annular grooves 42 in a spacially non-interfering relationship with any portion of female embossing roll 22. As used herein, spacially non-interfering relationship means that knuckles 38 project into annular grooves 48 at nip 26 without any portion of knuckles 38 attempting to occupy the same space as annular extensions 42. The tops of knuckles 38 do not contact the top surfaces of annular extensions 42. For perf-embossing the sides of knuckles 38 may be allowed to contact the sides of grooves 44 although this is not absolutely necessary to accomplish perf-embossing. Further, for embossing without perforating there should be no physical contact of knuckles 38 with any portion of female embossing rolls 22.

Figure 3:
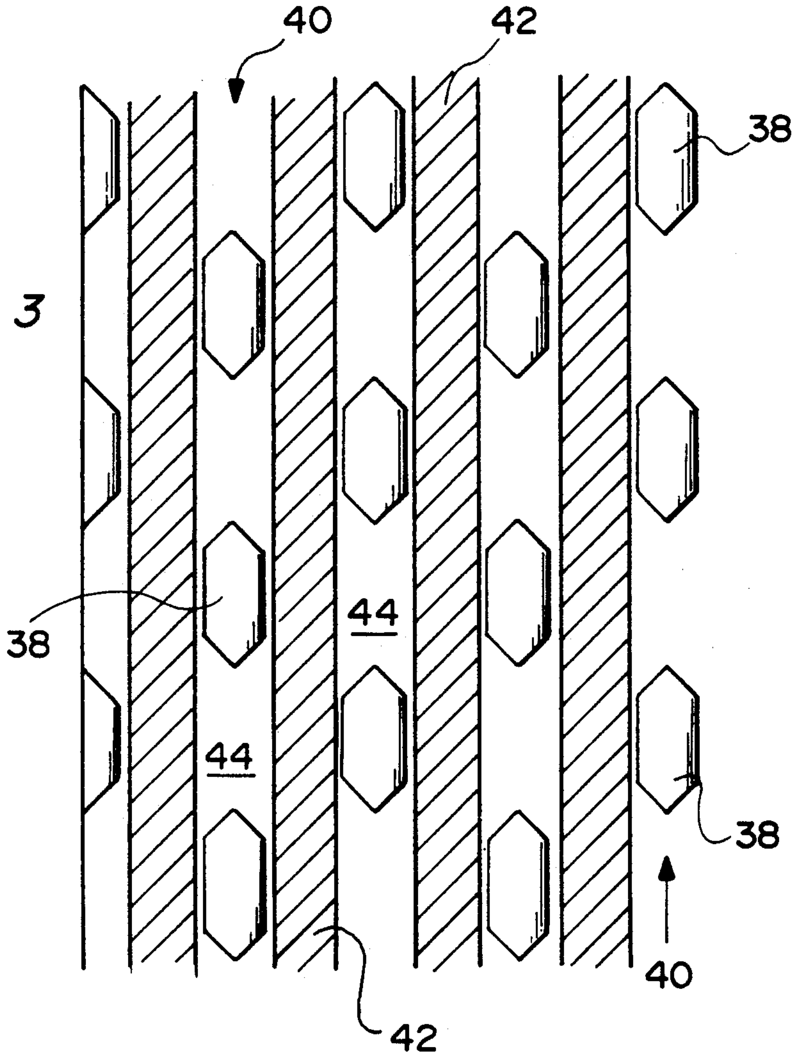
FIG. 3 is an enlarged plan view of the surfaces of the embossing rolls projected onto a single plane dipicting a knuckle/groove relationship preferable for perf-embossing.

Note that knuckles 38 are offset to one side of grooves 44 in FIG. 3. The arrangement is used particularly for perf-embossing where it is desired to actually make small tears or cuts in the towel. To accomplish this, sides of knuckles 38 reside in close proximity or may even contact the sides of annular grooves 44.

Figure 5:
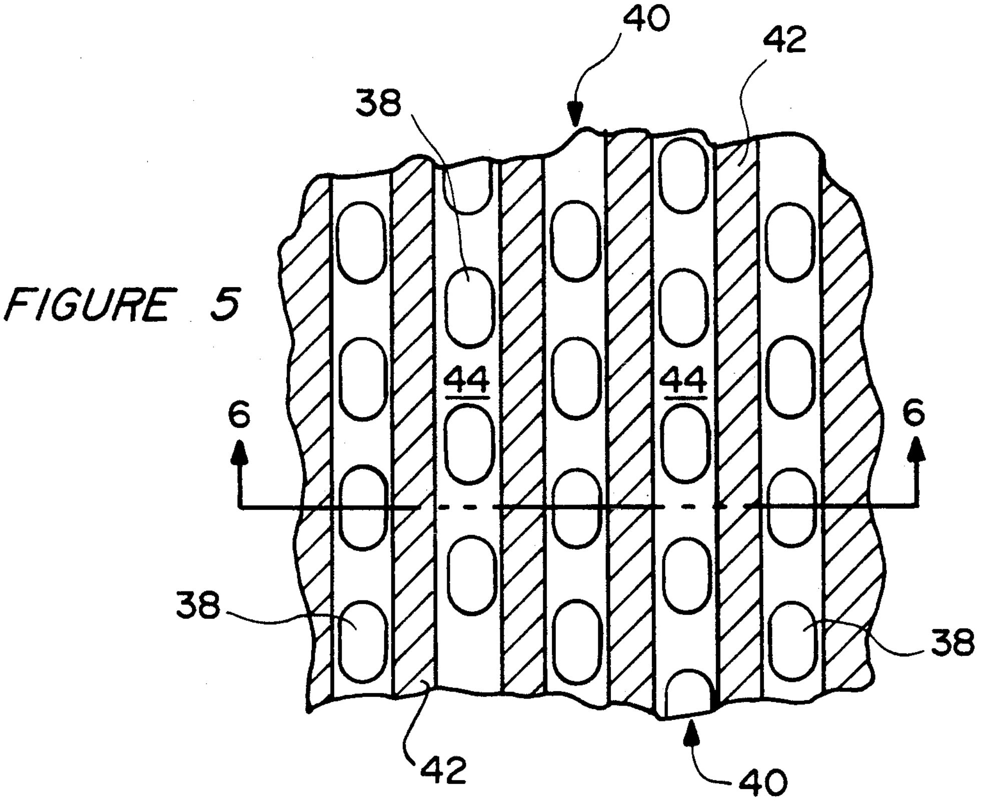
FIG. 5 is an enlarged plan view of the surfaces of embossing rolls projected onto a single plane depicting a knuckle/groove relationship preferable for embossing without perforating.
Figure 6:
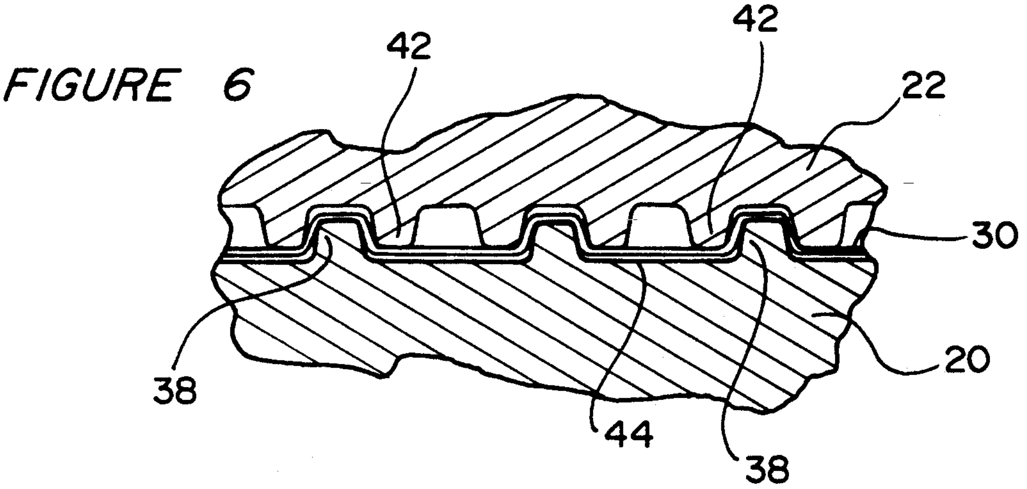
FIG. 6 is a cross-sectional view taken along line 6—6 of FIG. 5 with towel residing between the embossing rolls.

FIG. 5 depicts an alternative knuckle/groove relationship to that shown in FIG. 3. Note that knuckles 38 reside substantially in the middle of grooves 44. This is typically referred to as a center float arrangement. This arrangement is preferable when embossing without perforating is desired. FIG. 6 shows a cross-section taken along line 6—6 of FIG. 5 with towel 30 residing between first and second embossing rolls 20, 22. There it is shown clearly that the position of knuckles 38 avoids contact between the side of knuckles 38 and the sides of grooves 44.

As stated above, preferably only first or male embossing roll 20 is driven by turning a crank 24. The movement of the flat paper toweling 36 through nip 26 will impart rotational movement to second embossing roll 22. However, it is not necessary that the rotational movement of second embossing roll 22 be in registration with the rotation of first embossing roll 20. This is because knuckles 38 interact only with continuous annular extensions 42 and continuous annular grooves or slots 44 in a spacially non-interfering relationship. As such, if second embossing roll 22 does not keep up rotationally with first embossing roll 20, paper toweling 36 will slide past second embossing roll 22 at nip 26 without breaking or tearing the paper toweling 36. In such manner, the present invention allows for the embossing of paper toweling in the dispenser without circumferential timing of the embossing rolls.

Figure 4:
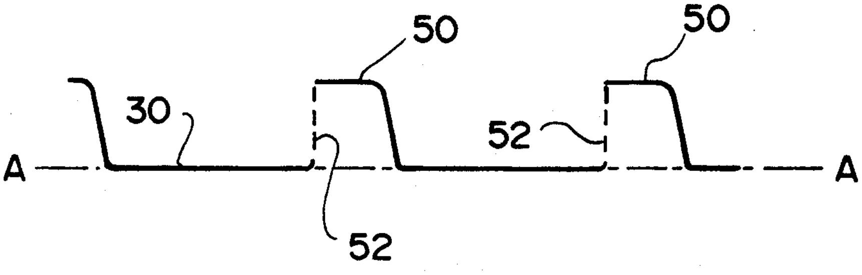
FIG. 4 is a cross-sectional of paper toweling perf-embossed by the apparatus of the present invention.

The resulting embossed sheet is two sided. A sectional view of such a perf-embossed sheet is shown in FIG. 4. The embossed pegs 50 lie unidirectionally above lamina A—A such that the surface of the sheet on the side of grooved roll will look similar to a typically perf-embossed sheet. The surface of the toweling on the side of the first embossing roll 20 will be flat with depressions corresponding to pegs 50. Small cuts or tears in the perf-embossed sheet are identified by dashed lines 52.

Preferably, first and second embossing rolls 20, 22 are manufactured from steel, aluminum or a hard plastic material. The pitch, knuckle width, groove width, depth of groove, depth of penetration of knuckle into groove and embossing roll diameter may vary substantially depending on the type and amount of embossing desired and the thickness of the web being embossed as well as the amount of force available to drive the embossing rolls. For embossing paper toweling within cabinet 10 as depicted in FIG. 1 by manually rotating crank 24, the pitch of knuckles 38 is preferably in the range of 0.081 to 0.101 inches. The width of knuckles 38 is preferably in the range of 0.034 to 0.044 inches. The width of grooves 44 is preferably in the range of 0.044 to 0.057 inches. The depth of grooves 44 is preferably in the range of 0.044 to 0.057 inches. The depth of penetration of knuckles 38 into grooves 44 is preferably in the range of 0.020 to 0.032 inches. Embossing rolls 20, 22 have been used with diameters in the range of 0.625 to 1.0 inches. The diameters of embossing rolls 20, 22 will, of course, govern the number of rotations necessary to dispense a usable length of towel 30.

It should be recognized that embossing rolls 20, 22 may be motor driven as opposed to manually driven by crank 24. The availability of greater rotational force to drive embossing rolls 20, 22 would allow for modifications pitch, groove width, knuckle width, groove depth, depth of penetration and embossing rolls diameter well outside the preferred dimensional ranges stated above. With that in mind, it should also be recognized that embossing rolls 20, 22 of the present invention could be employed in a finishing machine in a mill.

As stated above, embossing rolls 20, 22 are preferably operated without timing gears. Preferably, crank 24 drives only male embossing roll 20. However, it should be understood that crank 24 may be used to drive female embossing roll 22 or, alternatively, embossing rolls 20, 22 may be geared together such that operation of crank 24 drives both embossing rolls 20, 22.

From the foregoing, it will be seen that this invention is one well adapted to attain all of the ends and objects hereinabove set forth together with other advantages which are apparent and which are inherent to the apparatus It will be understood that certain features and subcombinations are of utility and may be employed with reference to other features and sub-combinations. This is contemplated by and is within the scope of the claims.

As many possible embodiments may be made of the invention without departing from the scope thereof, it is to be understood that all matter herein set forth or as shown in the accompanying drawings is to be interpreted as illustrative and not in a limiting sense.

What is claimed is:

1. A rolled paper embossing dispenser comprising:

(a) a cabinet;

(b) means for supporting a roll of paper in said cabinet;

(c) a male embossing roll mounted within said cabinet, said male embossing roll having a plurality of spaced, circumferentially extending bands extending therefrom, each of said circumferential bands including a plurality of discrete, spaced-apart knuckles extending substantially radially from said male embossing roll; and (d) a female embossing roll mounted within said cabinet to form a nip with said male embossing roll, said female roll having a plurality of annular grooves and a plurality of continuous annular extensions arranged in alternating relationship, each of said annular grooves being in spatially noninterfering alignment with a single circumferential band of said knuckles;

(e) means for a user to rotationally drive one of said embossing rolls, the other of said embossing rolls being independently rotatable so that it rotates only in response to the paper being drawn through said nip.

2. A rolled paper embossing dispenser as recited in claim 1 wherein:

each of said discrete, spaced-apart knuckles of one of said circumferential bands is offset from said discrete, spaced-apart knuckles of immediately adjacent ones of said circumferential bands.

3. A rolled paper embossing dispenser as recited in claim 2 wherein:

said male and female embossing rolls interact to form a plurality of embossments all projecting in a single direction from said sheet material as said sheet material is drawn between said male and female embossing rolls.

4. A rolled paper embossing dispenser as recited in claim 1 wherein:

said male and female embossing rolls interact to form a plurality of embossments all projecting in a single direction from said rolled paper as said rolled paper is drawn through said nip and dispensed from said cabinet.

5. A rolled paper embossing dispenser comprising:

(a) a cabinet;

(b) means for supporting a roll of paper in said cabinet;

(c) a nip formed by a first embossing roll and a second embossing roll, said first and second embossing rolls mounted within said cabinet, said first embossing roll having a plurality of annular bands, each of said annular bands including a plurality of discrete, circumferentially spaced-apart knuckles, each of said knuckles projecting substantially radially from said first embossing roll, said second embossing roll having a plurality of annular slots and a plurality of annular extensions arranged in alternating relationship, each of said annular slots being configured to receive said knuckles without contacting any portion of said knuckles;

(d) means for a user to rotationally drive one of said embossing rolls, said embossing rolls having no intermeshing gear means such that the other of said embossing rolls rotates only in response to the paper being drawn through said nip.

6. A rolled paper embossing dispenser as recited in claim 5 wherein:

each of said discrete, spaced-apart knuckles of one of said circumferential bands is offset from said discrete, spaced-apart knuckles of immediately adjacent ones of said circumferential bands.

7. A rolled paper embossing dispenser comprising:

(a) a cabinet;

(b) means for supporting a roll of paper in said cabinet;

(c) a first embossing roll mounted within said cabinet, said first embossing roll having a plurality of spaced annular bands, each of said annular bands comprising a plurality of discrete, circumferentially spaced-apart knuckle projections extending substantially radially from said first embossing roll;

(d) a second embossing roll mounted within said cabinet substantially parallel to said first embossing roll, said second roll having a plurality of annular grooves in an otherwise smooth surface thereof, said annular grooves being configured to receive said knuckle projections such that said knuckle projections do not spatially interfere with or contact said second embossing roll; and (e) means for manually rotationally driving one of said embossing rolls, the other of said embossing rolls being freely rotatable such that said other embossing roll rotates only in response to the paper being drawn between said embossing rolls.

8. Apparatus for embossing a roll of sheet material comprising:

(a) a male embossing roll having a plurality of projections extending radially therefrom arranged in spaced, circumferential bands of discrete, spaced-apart knuckles; and (b) a female embossing roll mounted substantially parallel to said male embossing roll to form a nip therebetween, said female embossing roll having a plurality of continuous annular grooves and a plurality of continuous annular extensions arranged in alternating relationship, each of said annular grooves being configured to receive said knuckles without contacting any portion of said knuckles, said male and female embossing rolls interacting to form a plurality of embossments all projecting in a single direction from said sheet material as said sheet material is drawn between said male and female embossing rolls;

(c) means for a user to rotationally drive one of said embossing rolls, the other of said embossing rolls rotating only in response to contact with said sheet material being drawn through said nip.

9. A rolled paper embossing dispenser as recited in claim 8 wherein:

each of said discrete, spaced-apart knuckles of one of said circumferential bands is offset from said discrete, spaced-apart knuckles of immediately adjacent ones of said circumferential bands.

* * * * *